July 30, 1957     J. R. BENFORD     2,800,718
VARIABLE POWER TELESCOPE RETICLE

Filed March 7, 1955

INVENTOR.
JAMES R. BENFORD
BY
ATTORNEY

2,800,718

VARIABLE POWER TELESCOPE RETICLE

James R. Benford, Irondequoit, N. Y., assignor to Bausch & Lomb Optical Company, Rochester, N. Y., a corporation of New York Application March 7, 1955, Serial No. 492,634

11 Claims. (Cl. 33—50)

This invention relates to variable power optical systems for telescopic sighting and aligning instruments and the like and more particularly it refers to improvements in sighting reticles which are used in such instruments.

Makers of variable power sighting instruments, such as gun telescopes and the like, have been unable in the past to produce a sighting reticle which functioned equally well at both high and low magnifications of the target image. The difficulty lies in the fact that when the reticle indicia are large enough to be comfortably seen at low magnification, they obscure a vital part of the target when seen at high magnification. The greater the magnification range of the instrument, the more noticeable this difficulty becomes. Consequently, difficulties and disadvantages result from the use of uniform diametered or dimensioned cross hairs, wires, bars, or the like in the reticles of such instruments.

It is an object of this invention to provide an improved sighting reticle for variable power aiming telescopes and the like which is so constructed that the shape and size of the indicia thereon appear to be substantially the same in the field of view for all magnifications of the instrument. A further object is to provide an improved reticle for variable power aiming telescope systems which will be effective and efficient in use for all magnifications of the system.

Further objects and advantages are to be found in the details of construction and the arrangement and combination of parts, reference being had to the drawings in which.

Figure 1:
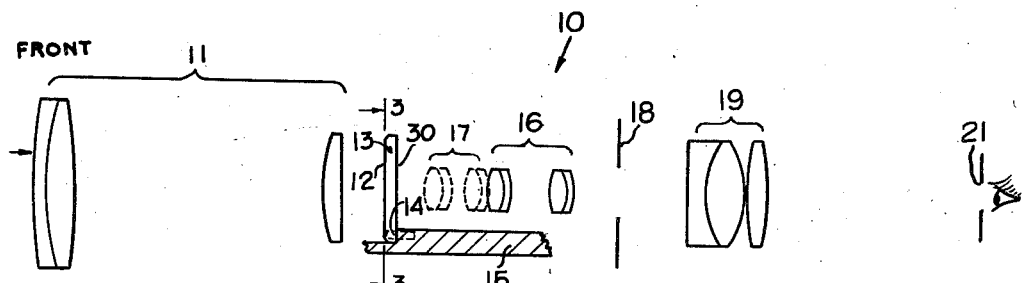
Fig. 1 is a diagrammatic view of a variable power telescope embodying one form of my invention.
Figure 2:
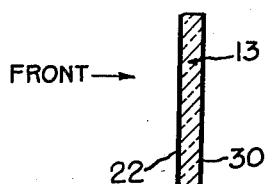
Fig. 2 is a vertical sectional view of the reticle disk of said telescope.

In Fig. 1 of the drawing, one form of my invention is shown as being embodied in a variable-power gun sighting telescope 10. Comprised in telescope 10 is an objective lens group 11 which focuses an image of the target area or field at a front surface 12 of a reticle disk 13. Said disk is made of transparent material such as glass and is held by any preferred conventional means, not shown, against a shoulder 14 in a telescope casing or barrel 15. Rearwardly of disk 13 a suitable erector lens 16 is provided which is movable longitudinally within the casing 15 to vary the power or magnification of the instrument. The dotted lines 17 represent the forward or high power position of the erector lens 16. An image of the target and reticle is relayed by the erector lens 16 to a focal plane 18 where it is viewed through an eyepiece 19 by the user's eye which is located at the exit pupil or eyepoint 21 of the telescope 10. On the front face 12 of the reticle disk 13, several sighting indicia areas or marks 22 are formed by any preferred process such as the well-known photometallic process which has the advantages of durability and permanence.

Figure 3:
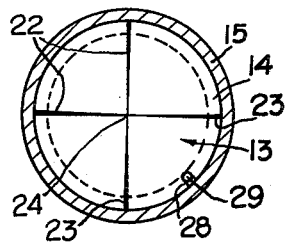
Fig. 3 is a cross-sectional view of the telescope taken on the line 3—3 of Fig. 1 showing a preferred form of my improved reticle.

According to this invention, the indicia marks or means 22 have substantially the same appearance for all magnifications of the image and this is accomplished by forming the indicia means as continuously tapered narrow areas or marks which preferably extend across the entire field of view. These indicia 22 are provided with a substantially constant taper from their wide portions 23 at the periphery of the reticle disk 13 to their centrally located inner ends or apices 24 where the indicia have a visible width of about .007–.011 mm. Thus, the apices of the areas 22 meet substantially at a common point 24 which is on the optical axis of the telescope system. In one successful embodiment as shown in Fig. 3, the indicia 22 are shaped by two straight radial lines having an included angle between them of about one degree, said indicia being united at 90° to each other at the center of the reticle to form a cross type sighting pattern. Obviously, other patterns may be provided which embody uniformly tapered areas or marks which meet at substantially the center of the reticle disk, the important requirement being that the appearance of the shape and the size of the reticle pattern be substantially the same for all magnifications of the instrument and that the meeting point of the indicia be visible and appear substantially unchanged in size.

Figure 6:
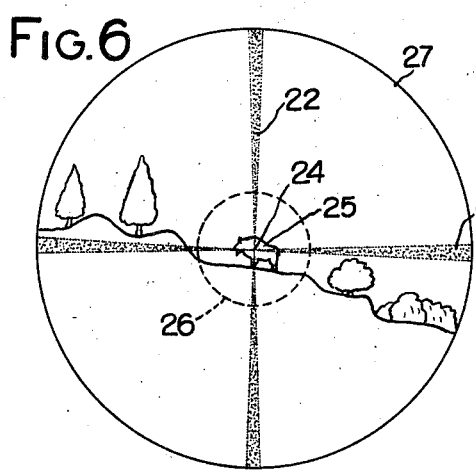
Fig. 6 is an enlarged view of a target and telescope reticle as seen in the field of view at low magnification.
Figure 7:
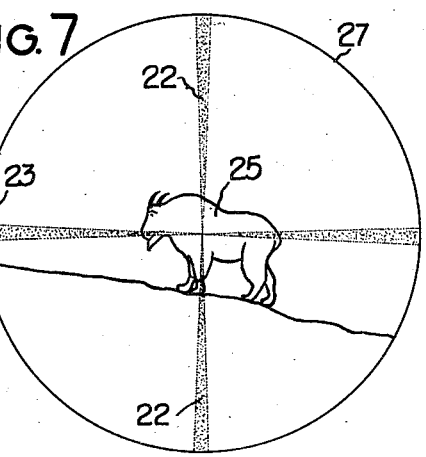
Fig. 7 is a view similar to Fig. 6 wherein the target and reticle are seen at high magnification.

In Figs. 6 and 7 is illustrated the similarity of appearance of the reticle pattern at low and high power settings, respectively, of the telescope 10. Furthermore, at all intermediate powers of the telescope, the shape and size of the reticle indicia will appear substantially the same as shown in Figs. 6 and 7.

It will be noticed in Fig. 6 that although the target 25 is relatively small at low magnification, it is not appreciably obscured by the indicia areas or marks 22 which may be seen extending through the exact aiming point on the target. This feature is a distinct advantage, especially in long distance shooting. The breadth of the landscape seen at low magnification in Fig. 6, is, of course, correspondingly large. At high magnification of the target 25, as shown in Fig. 7, it will be observed that the breadth of the visible landscape is confined to the area that is circumscribed by the dotted circle 26 in Fig. 6. This condition is a consequence of the movement of the erector lens 16 to its forward position 17 so that the area of visible landscape is progressively reduced as the magnification thereof is increased. By this action, both the target 25 and the sighting indicia areas 22 are progessively magnified together to the maximum size shown in Fig. 7, but because of the concomitant reduction of the area of the reticle plate which is seen as the magnification is increased, only those portions of the indicia 22 within the dotted circle 26 of Fig. 6 are seen by the user when the telescope is operated at highest magnification. The important feature is that the geometrical shape and the apparent size of the indicia means 22, when compared to the telescope aperture 27, appear substantially the same regardless of the amount of magnification and radial extent of the magnified portions of said indicia. While the indicia marks or areas 22 preferably extend from the center of disk 13 to its peripheral edge, it is not necessary that they run to the edge of the disk.

Figure 4:
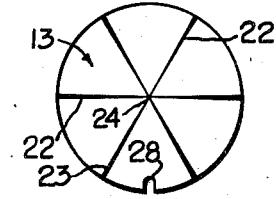
Fig. 4 is a front view of a modified form of the reticle shown in Fig. 3.

A modification of the preferred form of reticle indicia pattern is shown in Fig. 4 wherein six indicia areas 22 are shown, two being combined to form each of the crossed straight lines. To position one of these lines horizontally in either Fig. 3 or Fig. 4, an open slot 28 is formed in the edge of the reticle disk 13 midway between the outer ends of two adjacent indicia 22 and a pin 29, which is suitably fixed in the telescope tube 15, is fitted to engage in said slot. In another modification of the reticle pattern, shown in Fig. 5, three tapered indicia areas 22 have their apices meeting at a common point 24 which is on the axis of the telescope system. In this form, two of the areas extend in opposite directions to provide a substantially horizontal reference mark while the third indicia mark or area is positioned below the horizontal plane and about 90° from each of the other areas.

Figures 5, 8:
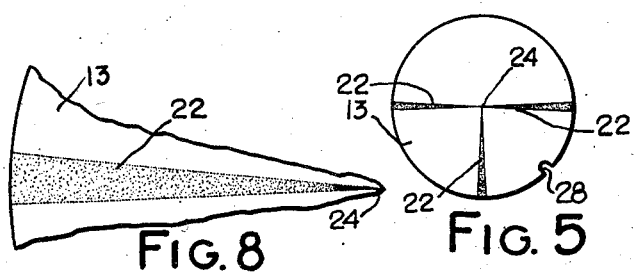
Fig. 5 is a front view of another modified form of reticle.
Fig. 8 is a fragmentary view of a modified type of indicia area.

Preferably, the indicia areas 22 are formed as semi-transparent marks so as to reduce to a minimum the reflection from the indicia of the light which enters the telescope through the eyepiece. The material from which the indicia are formed is preferably a durable material such as the metal sold under the trademark "Inconel," which is deposited by a suitable process such as the photometallic or evaporation process in the shape of the above-described indicia by means of suitably shaped masks. Deposition of said material is arrested when the thickness of the deposit is such as to be semi-transparent and has a light transmission factor of about 15% to 35%. Material deposited in this manner provides a distinctive, sharp sighting mark through which the target may be seen faintly and which will reflect no disconcerting light streaks. It is to be understood, however, that the advantages of my invention will also be attained if the indicia areas 22 are opaque. On the rear side of the reticle disk 13, an overall anti-reflection film 30 of a well-known type may be applied if desired to further reduce injurious reflections. As shown in Fig. 8, the indicia area 22 may consist of a semi-transparent layer of material, such as the metal "Inconel," which is deposited by the well-known evaporation process in a vacuum so that the density of the deposited layer gradually increases from the periphery of the disk 13 inwardly towards the center 24 so that the area is substantially opaque at its apex or center 24.

From the foregoing description it will be appreciated that there is here provided a simple and sturdy reticle which is equally effective for all magnifications of a variable powered telescope or the like in fulfillment of the objects of this invention and although only certain forms of this invention have been shown and described in detail, other forms and arrangements may be provided within the scope of the appended claims.

I claim:

1. The combination in a variable power telescope system for a sighting instrument of a reticle located substantially in the focal plane of the system, said reticle comprising a disk which transmits image forming light rays and indicia means carried by a surface of the disk, said indicia means comprising at least three narrow areas each of which is gradually tapered to an apex, the apices of all areas meeting at a common point on the optical axis of the system, each of said areas being formed of a layer of material which at least partially prevents the passage of light rays therethrough whereby the shape and size of the indicia areas in the central portion of the field of view will appear substantially the same at all magnifications of the system.

2. The combination of a variable power telescope system for a sighting instrument, a reticle located substantially in the focal plane of the system, said reticle comprising a transparent disk and indicia means carried by one surface of the disk, said indicia means comprising at least three uniformly tapered narrow areas of material which at least partially prevents the passage of light rays, all of said areas having their apices meeting at a common point on the optical axis of the system and extending outwardly to the peripheral portion of the disk and at least two of said areas extending in opposite directions whereby the size and shape of the indicia areas appear to be substantially the same in the field of view at all magnifications of the system.

3. A variable power telescope system for a sighting instrument including a reticle located substantially in the focal plane of the instrument, said reticle comprising a transparent disk and indicia means carried by the disk, said indicia means comprising four tapered narrow areas positioned substantially ninety degrees apart on a surface of the disk, each of said areas being uniformly tapered from the periphery of the disk to an apex, the apices of all areas meeting at a common point on the optical axis of the telescope system, said areas being formed of a material which at least partially prevents the passage of light rays therethrough whereby the shape and size of the indicia areas in the field of view will appear substantially the same at all magnifications of the telescope system.

4. A variable power telescope system for a sighting instrument having in combination a sighting reticle located substantially in the focal plane of the system, said reticle comprising a transparent disk and indicia means carried by a surface of the disk, said means comprising at least three tapered narrow areas formed of material which prevents the passage of at least some of the light rays, all of the areas tapering to a common point which is located on the optical axis of the system, each of said areas having a gradual, uniform taper from the edge of the disk to the center whereby the shape and size of the indicia will have substantially the same appearance in the field of view for all magnifications of the telescope system.

5. The combination in a variable power telescope system for a sighting instrument of a reticle located substantially at the focal plane of the system, said reticle comprising a transparent disk and indicia means carried by one surface of the disk, said indicia means comprising four narrow tapered areas each formed of a thickness of material which partially transmits light rays, each area being defined by two radial lines having an included angle of about one degree, the apices of the areas meeting substantially at the center of the disk which is on the optical axis of the system, the areas tapering to a dimension of about .007 to .011 millimeters, the tapered portions of the four areas being located at substantially 90 degrees apart whereby the shape and size of the indicia will appear substantially the same for all magnifications of the telescope system.

6. In combination with a variable power telescope having a reticle disk formed of a transparent material, a plurality of sighting indicia formed radially thereon so as to meet at the approximate center of said disk, the indicia being of appreciable width at the center and progressively increasing in width at a constant rate toward the periphery of the disk to provide tapered marks radiating outwardly from said center, said indicia being formed on said disk from semi-transparent material having a transmittance between 15 and 35 percent of the incident light whereby said marks are relatively free from annoying reflections and have the same apparent size and shape relative to the size of the field image for all magnifications of the field image.

7. In a reticle for a variable power telescope system the combination of a transparent disk and indicia means carried on a surface of the disk, said indicia means comprising a narrow uniformly tapered area of material extending radially from the center of the disk, said area being formed of a material which at least partially prevents the passage of light rays, the apex of the area being positioned substantially at the center of the disk and having a dimension of about .007–.011 mm., the radial sides of the area defining and included angle of about one degree whereby the shape and size of the indicia means will have substantially the same appearance at all magnifications of the telescope system.

8. A sighting instrument comprising a variable power telescope system, and a reticle located substantially in the focal plane of the system, said reticle comprising a disk which transmits image forming light rays and indicia means carried by a surface of the disk, said indicia means comprising at least three narrow areas each of which is formed of a material which at least partially prevents the passage of light rays therethrough, each area being gradually tapered throughout its entire length to an apex which lies at the optical axis of the system, each area extending radially outward beyond the area of the reticle visible at high magnification of the system whereby the size and shape of the indicia will appear substantially the same in the field of view for all magnifications of the system.

9. A sighting instrument comprising a variable power telescope system, and a reticle located substantially in the focal plane of the system, said reticle comprising a plurality of spaced indicia areas each formed of a material which at least partially prevents the passage of light rays therethrough, each area being gradually tapered throughout its entire length to an apex which lies on the optical axis of the system, each area extending radially outward from said axis and beyond the portion of the reticle which is visible at high magnification of the system whereby the size and shape of each indicia area will appear substantially the same in the field of view for all magnifications of the system.

10. A reticle for use in a variable power telescope system and comprising a plurality of spaced indicia areas each formed of a material which at least partially prevents the transmission of light rays therethrough, each area being gradually tapered throughout its entire length to a common central point, means for supporting and positioning the reticle in the focal plane of the telescope system with said central point on the optical axis of the telescope system, each area extending radially outward from said central point and beyond the portion of the area which is visible at high magnification of the system whereby the size and shape of each area will appear substantially the same in the field of view for all magnifications of the system.

11. A sighting instrument comprising a variable power telescope system, and a reticle located substantially in the focal plane of the system, said reticle comprising a plurality of spaced indicia areas each formed of a material which at least partially prevents the passage of light rays therethrough, each area being gradually tapered throughout its entire length to an apex which points to the center of the field, at least one of the areas having its apex positioned on the optical axis of the telescope system whereby the size and shape of each area will appear substantially the same in the field of view for all magnifications of the system.

References Cited in the file of this patent

UNITED STATES PATENTS

| 1,386,611 | Ely | Aug. 9, 1921 |
| 1,428,389 | Miller | Sept. 5, 1922 |

FOREIGN PATENTS

| 349,314 | Great Britain | May 28, 1931 |